United States Patent [19]

Ono et al.

[11] Patent Number: 4,466,086
[45] Date of Patent: Aug. 14, 1984

[54] APPARATUS FOR PLAYING RECORD DISCS IN AN AUTOMATIC MODE AND AN AUTOMATIC MUSIC PIECE SELECTION MODE

[75] Inventors: Tsuyoshi Ono; Fumiaki Oono, both of Yokohama, Japan

[73] Assignee: Victor Company of Japan, Ltd., Yokohama, Japan

[21] Appl. No.: 278,112

[22] Filed: Jun. 29, 1981

[30] Foreign Application Priority Data

Jul. 2, 1980 [JP] Japan .......................... 55-93226[U]

[51] Int. Cl.$^3$ ...................... G11B 3/30; G11B 17/02; G11B 21/26
[52] U.S. Cl. ......................... 369/32; 369/33; 369/41
[58] Field of Search ............... 369/32, 33, 41, 231, 369/243, 244

[56] References Cited

U.S. PATENT DOCUMENTS

| | | | |
|---|---|---|---|
| 2,557,752 | 6/1951 | Miner | 369/135 |
| 3,368,080 | 2/1968 | Nakagiri et al. | |
| 3,937,903 | 2/1976 | Osann, Jr. | 369/33 |
| 3,979,588 | 9/1976 | Park | 369/33 |
| 4,079,261 | 3/1978 | Mullin | 369/41 |
| 4,079,944 | 3/1978 | Durley et al. | |
| 4,109,114 | 8/1978 | Baer et al. | |

FOREIGN PATENT DOCUMENTS 8,112,958 7/1981 France.
3,126,019 1/1984 Fed. Rep. of Germany.

Primary Examiner—Raymond F. Cardillo, Jr.
Attorney, Agent, or Firm—Ladas & Parry

[57] ABSTRACT

An automatic record disc playing apparatus comprises a tone arm having a connection part onto which a normal head shell having a plurality of terminals for transmitting signals which are picked up by a pickup cartridge and a head shell for automatic music piece selection play are selectively mounted, a circuit for producing a play mode changeover signal according to whether the normal head shell or the head shell for automatic music piece selection play is mounted onto the tone arm, and a circuit for urging the tone arm to perform an automatic music piece selection play operation and a normal play operation according to the play mode changeover signal produced by the circuit for producing the play mode changeover signal. The head shell for automatic music piece selection play has a detection part for detecting the sound groove portions, and the land portions between adjacent music pieces. The tone arm has a plurality of signal transmitting terminals which are connected to terminals for transmitting signals of the normal head shell and the head shell for automatic music piece selection play, and a plurality of terminals exclusively for the detection part which are connected to terminals exclusively for the detection part of the head shell for automatic music piece selection play. The circuit for producing the play mode changeover signal produces a play mode changeover signal according to whether the terminals exclusively for the detection part are or are not interconnected.

6 Claims, 7 Drawing Figures

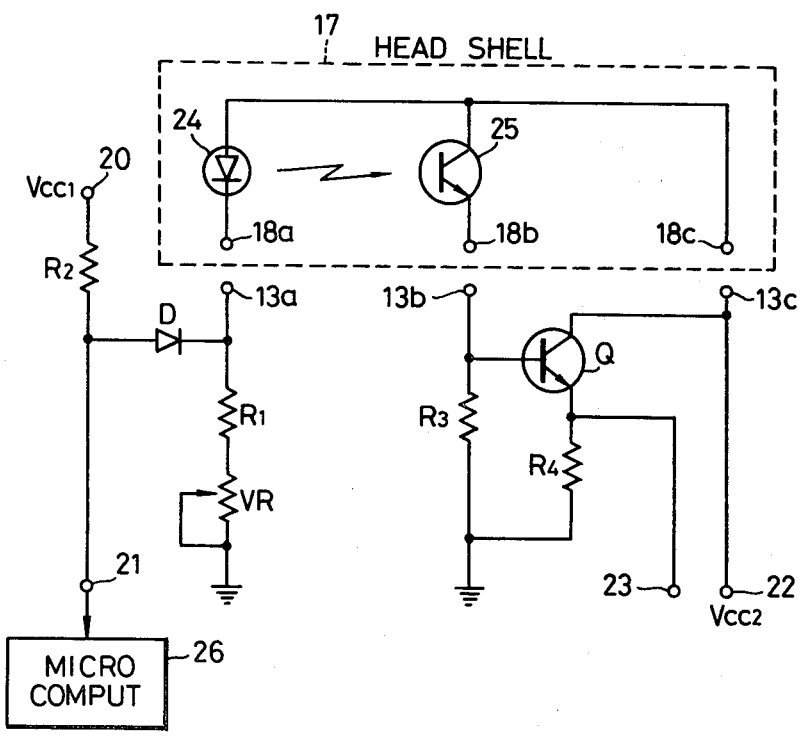

APPARATUS FOR PLAYING RECORD DISCS IN AN AUTOMATIC MODE AND AN AUTOMATIC MUSIC PIECE SELECTION MODE

BACKGROUND OF THE INVENTION

The present invention generally relates to automatic record disc playing apparatuses, and more particularly to an automatic record disc playing apparatus capable of selectively switching over to perform an automatic music piece selection play and a normal automatic play of a record disc.

The present inventors et al. have previously proposed an automatic music piece selection playing apparatus by copending U.S. patent application Ser. No. 156,775 filed on June 4th 1980, titled "Programmable Automatic Record Player" this application has issued as U.S. Pat. No. 4,361,880. The proposed apparatus starts playing from a position where a music piece address is preset, by presetting playing music piece addresses within a record disc, and detecting the number of music pieces recorded in the record disc upon moving of a tone arm by use of detection means which is provided in a pickup cartridge. However, the pickup cartridge used in the above automatic music piece selection playing apparatus has a special type cartridge which is exclusively for use in the above automatic music piece selection playing apparatus provided with the above described detection means.

On the other hand, there are cases where it is desirable to use a predetermined pickup cartridge which is suited for use with a specific kind of music piece recorded in the record disc. In the above case, it is essential that the automatic music piece selection playing apparatus is capable of performing a normal automatic play operation. In addition, irrespective of the above described demand, there are cases where it is desirable to simply perform a normal automatic play operation or a manual play operation in the automatic music piece selection playing apparatus.

Accordingly, in order to satisfy the above demand, the automatic music piece selection playing apparatus must be provided with a function for performing a normal automatic play operation. Hence, one method of constructing such a playing apparatus, is to provide a changeover switch for changing over to or from an automatic music piece selection play operation mode, an automatic play operation mode, and a manual play operation mode, and operating the above changeover switch to perform the changeover.

However, when the playing apparatus is constructed as described above, there is a possibility that the changeover switch is operated erroneously, or the operation of the changeover switch is forgotten. Moreover, the cost of the playing apparatus is increased by providing the above changeover switch. Further, there is a disadvantage in that space is required to provide the above mechanism, and the construction of the operation panel becomes complex.

SUMMARY OF THE INVENTION

Accordingly, a general object of the present invention is to provide a novel and useful automatic record disc playing apparatus in which the above described problems have been overcome.

Another and more specific object of the present invention is to provide an automatic record disc playing apparatus which is constructed so that the playing mode is automatically changed over according to the kind of head shell for the pickup cartridge which is mounted to the tone arm according to the playing mode.

Still another object of the present invention is to provide an automatic record disc playing apparatus which is constructed so that the playing mode is automatically changed over according to the differences in the connection terminals with respect to a head shell for automatic music selection play and a head shell for normal automatic play.

Other objects and further features of the present invention will be apparent from the following detailed description when read in conjunction with the accompanying drawings.

BRIEF DESCRIPTION OF THE DRAWINGS

FIG. 2 is a circuit diagram showing an embodiment of an essential part of an automatic record disc playing apparatus according to the present invention;

DETAILED DESCRIPTION

Figure 1A:
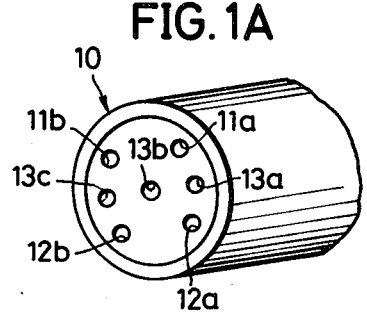
FIGS. 1A, 1B, and 1C are perspective views respectively showing a tone arm, a normal head shell, and a connection part of a head shell for automatic music piece selection play.

The tip end of a tone arm which is used in an automatic record disc playing apparatus according to the present invention, has a configuration shown in FIG. 1A. Jack terminals 11b and 11a for right and left channel signal transmission, and grounding jack terminals 12a and 12b are respectively provided at the tip end of a head shell mounting part of the tone arm 10. Jack terminals 13a, 13b, and 13c are respectively provided horizontally in one line between the above jack terminals 11a and 11b, and the jack terminals 12a and 12b.

Figure 1B:
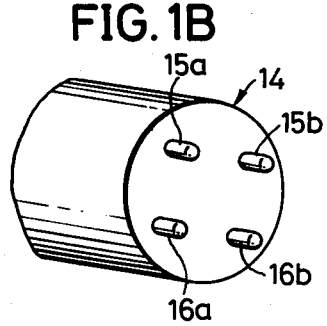
Figure 1C:
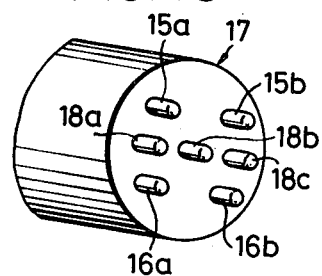

The configuration of a head shell which is connected to the mounting part of the above tone arm 10, is shown in FIGS. 1B and 1C. A connection part of a pickup cartridge head shell 14 for normal automatic play, has pin terminals 15a, 15b, 16a, and 16b which are respectively plugged into the jack terminals 11a, 11b, 12a, and 12b, as shown in FIG. 1B. Moreover, a connection part of a pickup cartridge head shell 17 for automatic music piece selection play has pin terminals 18a, 18b, and 18c which are respectively plugged into the jack terminals 13a, 13b, and 13c, as shown in FIG. 1C, in addition to the pin terminals 15a, 15b, 16a, and 16b which are respectively plugged into the jack terminals 11a, 11b, 12a, and 12b.

When performing a normal automatic play, the head shell 14 is mounted to the mounting part of the tone arm 10. Accordingly, the pin terminals 15a, 15b, 16a, and 16b are respectively plugged into the jack terminals 11a, 11b, 12a, and 12b, and the right and left channel signals which are picked up by the pickup cartridge are thus transmitted.

In the above state, the pin terminals are not plugged into the jack terminals 13a, 13b, and 13c in FIG. 2. A resistor R1 and a variable resistor VR for adjusting the sensitivity are connected in series, between the jack terminal 13a and ground. A resistor R2 is connected between a terminal 20 of a power source voltage Vcc1 and a mode changeover voltage output terminal 21. Further, a diode D is connected between a connection point between the resistor R2 and the output terminal 21, and a connection point between the jacket terminal 13a and the resistor R1. This diode D is connected so that a current flows through the resistors R2 and R1 from the voltage source terminal 20, that is, so that the diode D becomes forward-biased.

Therefore, in this state, a current flows through the resistor R2, the diode D biased in the forward direction, the resistor R1, and the variable resistor VR, from the terminal 20. The resistances of these resistors are selected so as to satisfy the relationship R2>R1°VR(max). Hence, the voltage at the output terminal 21 is substantially at the ground level (low level). The playing apparatus performs the automatic play operation by use of a micro-computer 26 connected to the output terminal 21 which performs operations which will be described hereinafter, due to the above low-level signal from the output terminal 21.

Next, when an automatic music piece selection play is to be performed, a head shell 17 is mounted onto the mounting part of the tone arm 10. Thus, the pin terminals 15a, 15b, 16a, and 16b are respectively plugged into the jack terminals 11a, 11b, 12a, and 12b, while at the same time, the pin terminals 18a through 18c are respectively plugged into the jack terminals 13a through 13c. Accordingly, in FIG. 2, the jack terminals 13a through 13c are respectively connected with the pin terminals 18a through 18c.

Therefore, a voltage is applied to a light-emitting element 24 comprising a light-emitting diode (LED) and a light-receiving element 25 comprising a phototransistor, from a terminal 22 of a power source voltage Vcc2. Accordingly, a current flows through the light-emitting element 24, the resistor R1, and the variable resistor VR, from the terminal 22, whereby the light-emitting element emits light. The power source voltages Vcc1 and Vcc2 are selected so as to satisfy the relationship Vcc2≧Vcc1. Since the diode D is connected in the reverse direction with respect to the flow of current at this state (reverse-biased), the current does not flow through the diode D, and the voltage at the output terminal 21 becomes substantially equal to the voltage Vcc1, that is, a high level. The playing apparatus performs an automatic music piece selection play operation by use of the micro-computer 26 as will be described hereinafter, due to the high-level signal from the output terminal 21.

Figure 3:
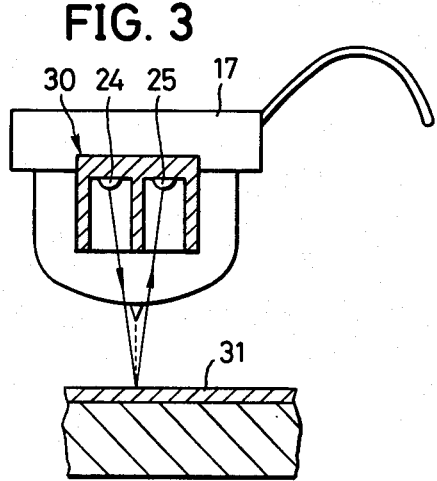
FIG. 3 is a partial cross-sectional front view showing an example of a head shell for automatic music piece selection play.

A detection part 30 provided with the light-emitting element 24 and the light-receiving element 25, is fixed to the tip end of the head shell 17 as shown in FIG. 3. The light from the light-emitting element 24 is projected onto and reflected from the surface of a record disc 31, and the reflected light is received by the light-receiving element 25. In a case where an incident light is projected onto walls of a groove in the record disc 31, the light reflected by the walls of the groove is not directed toward the light-receiving element 25. Accordingly, when the incident light is being projected onto a part where there are many sound grooves, only a small quantity of reflected light reaches the light-receiving element 25. On the other hand, in a case where an incident light is projected onto a portion of many plannar parts such as a land between adjacent music pieces (hereinafter simply referred to as a land), and lead-in and lead-out groove parts, the greater portion of the light reflected at a plannar parts of this character, is directed toward the light-receiving element 25.

When the light-receiving element 25 receives the reflected light, a transistor Q shown in FIG. 2 becomes ON, and a signal having a level which is respective of the reflected light is obtained through a terminal 23. Moreover, resistors R3 and R4 are respectively connected to the base and the emitter of the transistor Q.

Figure 4:
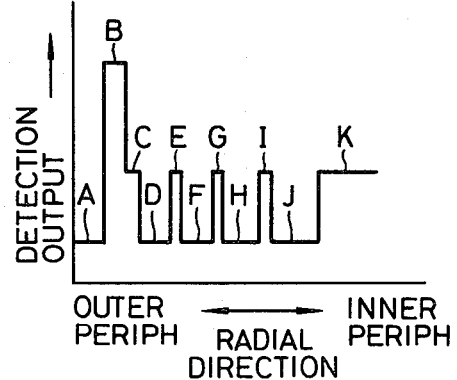
FIG. 4 is a diagram for explaining a detected output of a detector for detecting the land between adjacent recorded music pieces.
Figure 5:
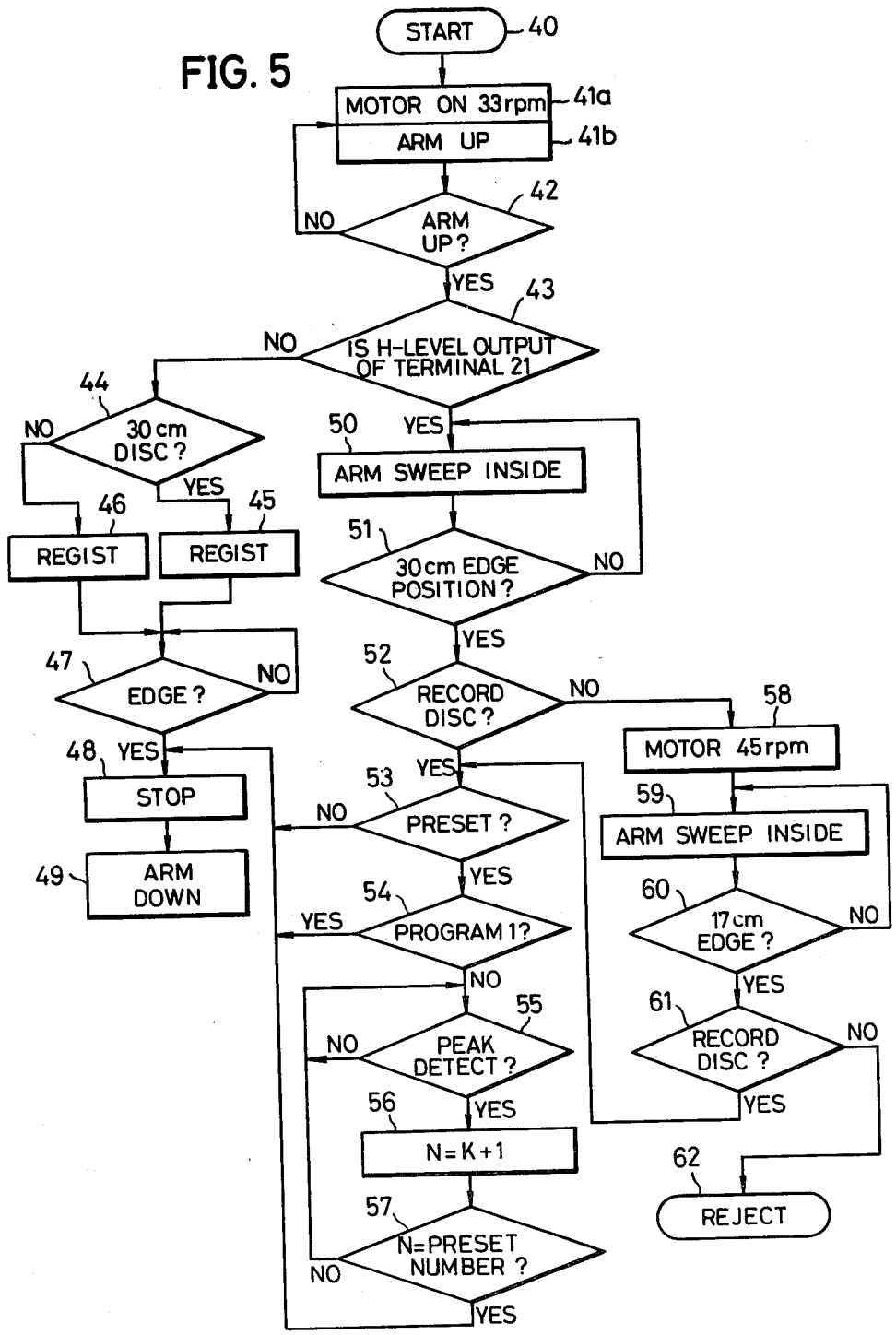
FIG. 5 is a flow-chart for explaining the operation of a micro-computer used in the automatic record disc playing apparatus according to the present invention.

Accordingly, the output obtained from the terminal 23 at the time when the tone arm is swung horizontally from its resting position outside of a turntable to the innermost recording position of the record disc, becomes as indicated in FIG. 4. In the graph of FIG. 5, the ordinate represents detected output, while the abscissa represents positions in the radial direction of the record disc, the outer periphery of the record disc being toward the left and the center of the record disc being toward the right. In this graph, the ordinate indicates the detected output of the light-receiving element 25 when the light from the light-emitting element 24 is projected onto various parts, namely, the motor board surface as indicated at portion A, the turntable surface as indicated at portion B, the lands on the record disc as indicated at portions C, E, G, and I, and recorded parts on the record disc as indicated at portions D, F, H, and J.

Since the detected output differs as shown in FIG. 4, at the sound groove portion and at the land portion, the music piece address can be known by detecting and counting the detected output portions such as E, G, and I.

Next, the operation of a micro-computer which is changed over of its mode according to a changeover signal supplied from the output terminal 21, will be described in conjunction with FIG. 5.

When an operation is started at a step 40, a turntable driving motor is turned ON at steps 41a and 41b, to rotate the turntable at a rotational speed of 33 rpm, and at this point, the tone arm is raised. A step 42 discriminates whether the tone arm has been positively raised. Then, discrimination is performed on whether the output level at the output terminal 21 is of high level, that is, whether the head shell mounted onto the tone arm 10 is for automatic music piece selection play, at a step 43.

In a case where the head shell 14 for normal automatic play is mounted onto the tone arm, the output level at the output terminal 21 is of low level as described above, and the result obtained at the step 43 is accordingly NO. In this case, discrimination is performed on whether the record disc placed on the turntable is a 30-centimeter disc or a 17-centimeter disc at a following step 45, and in each of the cases corresponding to when the record disc is of a 30-centimeter or a 17-centimeter disc, the diameter of the record disc is set into a register in corresponding steps 45 and 46. A step 47 discriminates whether the cartridge is at a disc outer peripheral edge position corresponding to the diameter of the record disc, by use of an output supplied from a rotational position detection part (not shown). Therefore, when the cartridge reaches the edge position, the rotational movement of the tone arm 10 is stopped at a step 48, and the tone arm 10 is lowered at a step 49. Accordingly, a normal automatic play is started.

On the other hand, in a case where the head shell 17 for automatic music piece selection play is mounted onto the tone arm 10, the output level at the output terminal 21 is of high level as described above, and the result obtained at the step 43 is YES. In this case, the tone arm is rotationally moved towards the inner periphery of the record disc at a following step 50. Then, discrimination is performed on whether the tone arm 10 is at a position corresponding to the outer peripheral edge position of the record disc having a diameter of 30 centimeters, at a step 51. When the result obtained at the step 51 is NO, the tone arm 10 continues to move rotationally, and at the point where the result obtained at the step 51 becomes YES, discrimination is performed on whether the record disc exists at that position according to the output of the detection part 30, at a step 52.

In a case where the result obtained at the step 52 is YES, discrimination is performed on whether a selected music piece has been preset at a step 53. When the result obtained at the step 53 is NO, that is, when the selected music piece has not been preset, the step 48 is performed to stop the rotational movement of the tone arm 10 and perform the play operation.

In a case where the result obtained at the step 53 is YES, discrimination is performed on whether the preset program is the first music piece which has been selected, at a step 54. When the result obtained at the step 54 is YES, the step 48 is performed, to start the play operation. However, in a case where the result obtained at the step 53 is NO, the peak values E, G, and I of the detected output obtained from the detection part 30, are detected at a step 55. An operation $N=K+1$ (N is an integer) is performed to add one to a number of times K the above detection is performed at the step 55, at a step 56. Then, at a step 57, discrimination is performed on whether the value of N coincides with the number of the music piece address. In a case where the result obtained at the step 57 is NO, the above described operations are repeated, and when the result obtained at the step 57 becomes YES, the step 48 is performed to start the play operation from the music piece which has been preset.

When the result obtained at the step 52 is NO, that is, when there is no record disc at the 30-centimeter disc outer peripheral position, the rotational speed of the motor is increased at the step 58, to rotate the turntable at a rotational speed of 45 rpm. The tone arm 10 is moved rotationally towards the inner periphery of the record disc at a step 59, and discrimination is performed on whether the pickup cartridge has reached a position corresponding to the 17- centimeter disc outer peripheral position, at a step 60. If the result obtained at the step 60 is YES, a step 61 is performed to discriminate whether a record disc exists at that position. When the result obtained at the step 61 is YES, the step 53 is performed to repeat the above described operations. However, when the result obtained at the step 61 is NO, that is, when a record disc has not been placed on the turntable, a reject operation is performed at a step 62, to rotationally return the tone arm into the resting position.

As described above, according to the apparatus of the present invention, the play mode is automatically changed over by performing a simple operation in which the head shell 14 or 17 is changed according to the play mode. Therefore, the disadvantages which are likely to be introduced when a manual mode changeover switch is provided to perform the play mode changeover operation, are simply eliminated.

In the above described embodiment of the present invention, the apparatus is constructed to discriminate whether the jack terminals 13a through 13c are respectively connected to the pin terminals 18a through 18c, as a voltage variation by use of the resistors R2 and R1 and the variable resistor VR. However, the above discrimination can be performed by other means such as detecting the current flowing through the resistor R1, for example.

Further, this invention is not limited to these embodiments but various variations and modifications may be made without departing from the scope of the invention.

What is claimed is:

1. An automatic record disc playing apparatus comprising:

a tone arm having a connection part onto which a normal head shell having a plurality of terminals for transmitting signals which are picked up by a pickup cartridge and a head shell for automatic music piece selection play are selectively mounted, said head shell for automatic music piece selection play having detection means for detecting the sound groove portions and the land portions between adjacent music pieces, a plurality of terminals exclusively for said detection means, and a plurality of terminals for transmitting signals picked up by a pickup cartridge, said tone arm having a plurality of signal transmitting terminals which are connected to the terminals for transmitting signals of said normal head shell and said head shell for automatic music piece selection play, and a plurality of terminals exclusively for the detection means which are connected to the terminals exclusively for the detection means of said head shell for automatic music piece selection play;

play mode changeover signal producing means connected to at least one of the plurality of terminals exclusively for the detection means, for producing a play mode changeover signal as an output in states where the terminals exclusively for the detection means of said head shell for automatic music piece selection play and said tone arm are respectively connected to each other or not connected; and means for urging said tone arm to perform an automatic music piece selection play operation and a normal play operation according to the play mode changeover signal produced by said play mode changeover signal producing means.

2. An automatic record disc playing apparatus as claimed in claim 1 in which said play mode changeover signal producing means has a first voltage source, a second voltage source connected to one of the terminals exclusively for the detection means of said tone arm, a diode and a resistor means connected so that a current flows from said first voltage source to ground in a state where said head shell for automatic music piece selection play is not mounted onto said tone arm and so that a current flows from said second voltage source to ground in a state where said head shell for automatic music piece selection play is mounted onto said tone arm, and an output terminal for producing a play mode changeover signal which varies its level according to whether the current flows from said first voltage source or the current flows from said second voltage source.

3. An automatic record disc playing apparatus as claimed in claim 2 in which said resistor means comprises a first resistor connected between said terminal exclusively for the detection means and ground, and a second resistor connected between said first voltage source and said output terminal, and said diode is connected between a connection point between said terminal exclusively for the detection means and said first resistor and a connection point between said second resistor and said output terminal.

4. An automatic record disc playing apparatus as claimed in claim 3 in which said diode is connected with a polarity such that said diode is in the forward direction with respect to the direction of the flowing which flows from said first voltage source through said second resistor and said first resistor.

5. An automatic record disc playing apparatus as claimed in claim 2 in which the relationship between a voltage Vcc1 of said first voltage source and a voltage Vcc2 of said second voltage source is defined by a relation $Vcc1 \geqq Vcc2$.

6. An automatic record disc playing apparatus as claimed in claim 1 in which said detection means has a light-emitting element for emitting light towards the record disc and a light-receiving element for receiving a light which is emitted by said light-emitting element and reflected by said record disc, said terminals exclusively for the detection means of said tone arm comprises a first terminal connected to said play mode changeover signal producing means, a second terminal connected to a circuit for discriminating the output of said detection means, and a third terminal connected to said second voltage source, and said terminals exclusively for the detection means of said head shell for automatic music piece selection play comprises a first terminal connected to said light-emitting element, a second terminal connected to said light-receiving element, and a third terminal supplied with a voltage source voltage for supplying voltage to said light-emitting element and said light-receiving element, said first, second, and third terminals of said head shell for automatic music piece selection play respectively being connected to said first, second, and third terminals of said tone arm.

* * * * *